United States Patent [19]

Jordan

[11] 4,247,162
[45] Jan. 27, 1981

[54] RECTILINEAR DRIVE APPARATUS

[75] Inventor: Willie W. Jordan, Garland, Tex.

[73] Assignee: Abbott Laboratories, North Chicago, Ill.

[21] Appl. No.: 946,980

[22] Filed: Sep. 29, 1978

[51] Int. Cl.³ .............................................. G02B 21/26
[52] U.S. Cl. ....................... 350/86; 356/39; 308/3.9
[58] Field of Search ............... 250/201; 74/459, 424.8; 356/3.9, 244, 444, 256, 39; 350/86; 308/3, 6, 3.9; 29/DIG. 32; 128/24.2, 35, 43, DIG. 5

[56] References Cited

U.S. PATENT DOCUMENTS

| | | | |
|---|---|---|---|
| 3,720,849 | 3/1973 | Bardocz | 250/201 |
| 3,851,156 | 11/1974 | Green | 356/39 |
| 3,970,841 | 7/1976 | Green | 250/201 |
| 3,999,047 | 12/1976 | Green | 128/2 G |
| 4,061,914 | 12/1977 | Green | 356/39 |

*Primary Examiner*—John K. Corbin
*Assistant Examiner*—B. W. de los Reyes
*Attorney, Agent, or Firm*—John J. McDonnell

[57] ABSTRACT

Rectilinear drive apparatus for rapidly and accurately moving a driven component to a desired location with settling of vibration to be achieved immediately after reaching said location; including a frame, a stepping motor drive coupled to the driven component and bearing members slidably mounting the component to the frame. One of the bearing members includes a pair of rails with elongated bearing tracks, one rail mounted to the component and the other to the frame and with the tracks aligned along the direction of component movement. An elongated metal bar, preferably of brass or oil impregnated bronze is slidably mounted in the bearing tracks to slidably support the driven component. A ball nut assembly having a pair of high durometer rubber pads drivingly connects the stepping motor shaft to the driven component.

An X-Y rectilinear drive apparatus includes an upper X and a lower Y drive stage.

16 Claims, 4 Drawing Figures

RECTILINEAR DRIVE APPARATUS

This invention relates to a rectilinear drive apparatus, and particularly to apparatus for rapidly and accurately moving a driven component along a rectilinear direction to a desired location with the immediate settling of any virbation upon reaching the desired location.

BACKGROUND OF THE INVENTION

In many systems, it is desired to move a driven component along rectilinear, such as X and Y coordinate axes. Reference may be made to U.S. Pat. Nos. 3,851,156; 3,970,841; 3,999,047; and 4,061,914 all relating to an autofocussing system. The aforementioned patents disclose apparatus for differentially classifying white blood cells, wherein a plurality of sample cells are placed on a laboratory slide. The laboratory slide is incrementally moved in both X and Y direction to sequentially position each cell with respect to a microscope or other analyzing means.

If it is desired to increase the system throughput, i.e., the number of cells or samples which can be processed per unit time, it is necessary to reduce as much as possible the time required to position the driven component to move the cell to the desired location. The accuracy of movement at the desired increased speed must, or course, be preserved. Components presently available in the prior art may be utilized to achieve the increased speed and yet maintain accuracy of movement. As an example, low friction linear bearings are available having two rail members and a strip of retained rollers mounted therebetween for supporting the driven component during movement. In addition, a ball nut drive assembly affixed to the driven component and incrementally moved along a stepping motor shaft, when combined with the aforementioned prior art low friction linear bearings provide the speed of movement and the accuracy desired.

However, it was found that the system throughput was still restricted in that the driven component or stage upon reaching the desired location continued to vibrate and did not settle within the time required. "Settling" herein is defined as the condition of vibration in which there is no more than 0.5 micron of stage movement. Such undesired vibrations produce erroneous cell readings. One obvious solution is to allow the driven component or stage sufficient time to settle until the stage vibration is within an acceptable limit. Allowing the stage to settle until such a limit was obtained would have drastically reduced the system throuhput and is not compatible with the increased speed and accuracy of movement obtained.

Attempts were made to introduce friction into the system to reduce stage settling. This was found to adversely effect the accuracy or precision in stage movement. Likewise, when friction in the system is reduced to allow for greater accuracy of the movement, the stage settling times increased. It is thus desired to provide a rectilinear drive apparatus which can meet very stringent requirements and very accurately to a desired location with an absolute minimum of time required to reach stage settling.

SUMMARY OF THE INVENTION

In accordance with the principles of the present invention, there is provided a rectilinear drive apparatus including a frame, a pulsed stepping motor having a rotating shaft drivingly connected to a driven component or stage, and including improved bearing members enabling the stage to be rapidly and accurately located at the desired location with an absolute minimum of settling time. "Settling time" herein is defined as the time required for the stage to reach settling, i.e., less than 0.5 micron of stage movement, after reaching the desired location. In particular, at least one of the bearing members includes a pair of rail members, each having an elongated bearing track. One rail member is mounted to the frame and the other rail member is mounted to the driven component or stage with the tracks being disposed in facing relationship along the direction of stage movement. An elongated metal bearing bar slidably mounts within the bearing tracks to slidably support the stage as it is moved in a linear direction.

In a preferred embodiment of the invention, both X and Y axes rectilinearly driven stages are provided. The Y axis rectilinear platform is mounted by means of two linear bearing members to the frame. One of the bearing members comprises a standard pair of rail members, one of which is affixed to the frame and the other to the Y platform, with a strip of retained rollers slidably mounted in the track therebetween. The other Y bearing member comprises a pair of rail members one mounted to the frame and the other mounted to the platform with an elongated metal bearing bar, preferably formed of brass or oil impregnated bronze, slidably mounted in the bearing track. The solid bearing bar, which can also be formed of brass, provides radically improved Y stage settling. An upper X axis rectilinear driven stage includes an X platform mounted to the lower Y platform with a similar set of bearing members as are included in the Y stage. Both the X and the Y platforms are driven by respective stepper motors through ball nut assemblies drivingly connecting a respective stepper motor rotating shaft with the platforms. Each ball nut assembly includes two ball nuts each positively loaded against the stepper motor shaft by pressure exerted through rubber pads. It has been found that with an oil impregnated bronze bearing bar, an 80 durometer rubber pad is sufficient to overcome the slightly increased bearing friction, continually center the ball nut assembly to its mount, and yet is of sufficient compliance to reduce the generated end load on the stepping motor durng rapid stage acceleration.

Utilizing the preferred embodiment of the invention, in a constructed unit, movement in both the X and Y axes using step sizes of 8 microns provided position accuracies of plus or minus two microns over movable lengths of 400 microns. For stage movements of up to 200 microns, stage hysteresis at the desired location was less than 2.5 microns. The longest stage movement of 400 microns can be accomplished in 12.5 milliseconds with complete stage settling in which there is no more than 0.5 microns of stage movement, being accomplished within 42.5 milliseconds after the stage has reached the desired location. The constructed unit can process about 10 cells or samples per second, which rate is several times more than prior art units.

BRIEF DESCRIPTION OF THE DRAWINGS

FIG. 4 is a cross-sectional view illustrating a stepper motor rotating shaft and a ball nut assembly including a pair of dampener pads in accordance with another aspect of this invention.

DETAILED DESCRIPTION

Figure 1:
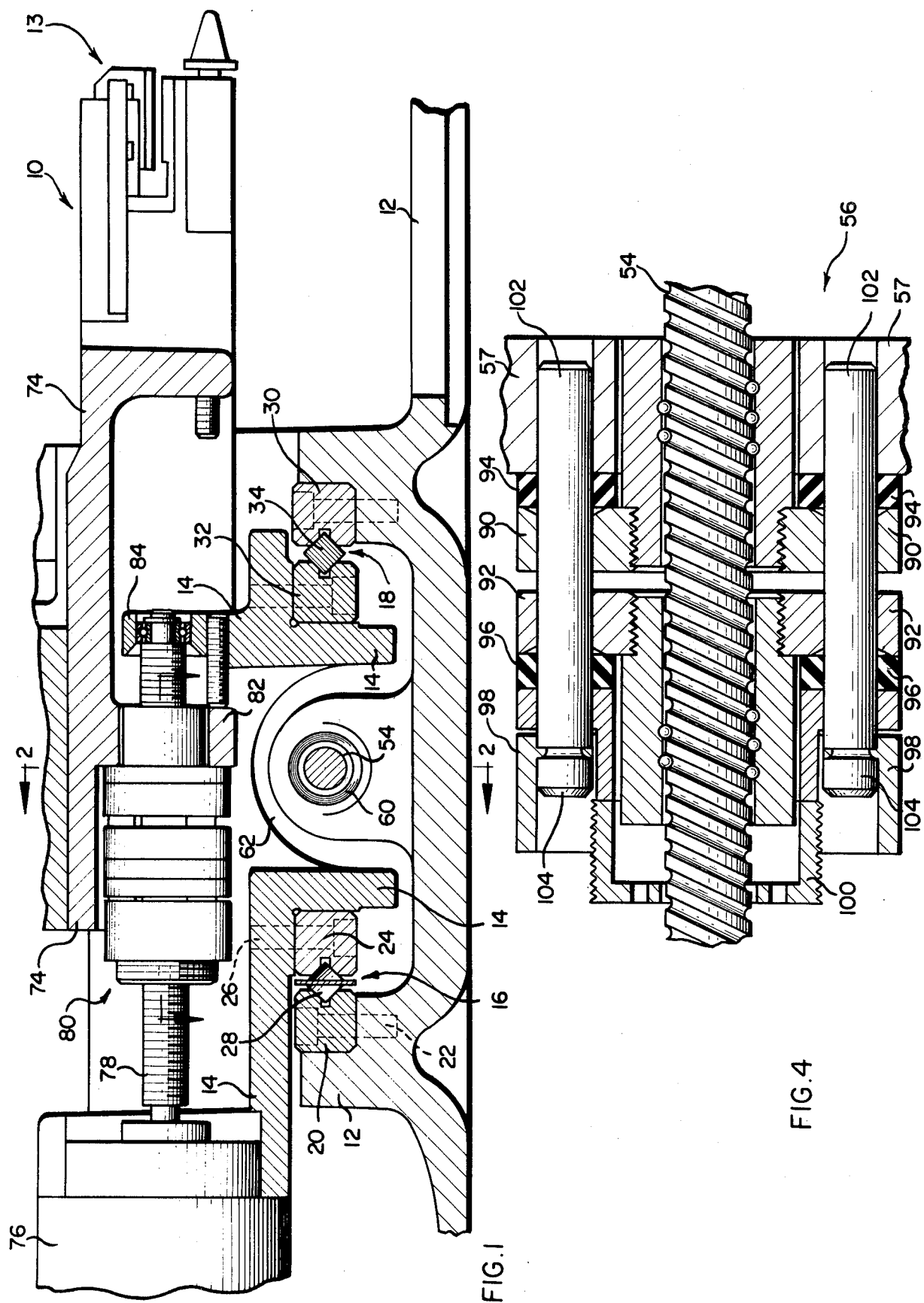
FIG. 1 is a fragmentary cross-sectional view of an X and Y rectilinear drive apparatus incorporating the principles of the present invention to provide rapid, precise and very low settling times, with the lower Y stage moving into and out of the plane of the drawing and the upper X stage moving at right angles thereto and parallel to the plane of the drawing.
Figure 2:
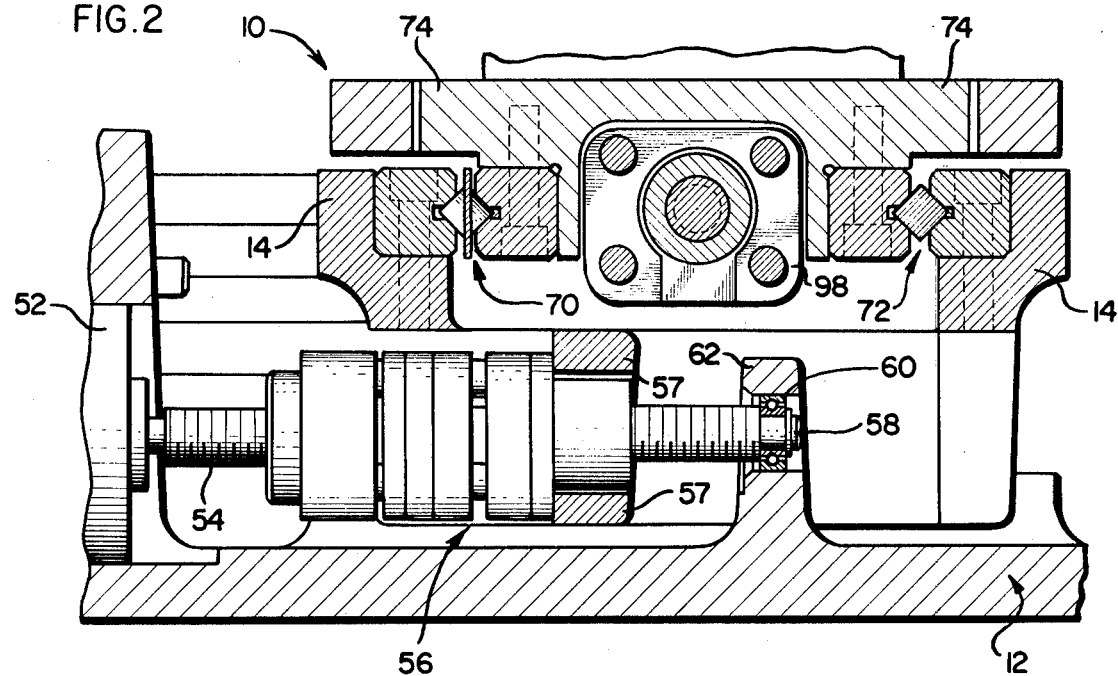
FIG. 2 is a fragmentary sectional view of the same apparatus as shown in FIG. 1, taken along the section lines 2—2 of FIG. 1, with the apparatus being conveniently located in position such that the lower Y stage moves parallel to the plane of the drawing and the upper X stage moves perpendicular thereto and into and out of the plane of the drawing.

Referring to FIGS. 1 and 2, there is illustrated a preferred embodiment of the present invention incorporating the principles thereof and comprising an X-Y rectilinear drive unit 10. Both stages are mounted with respect to a rigid, stationary frame 12. In FIG. 1 the lower Y stage moves along a reference Y axis perpendicular to and into and out of the plane of the drawing. An upper X stage moves in a reference X axis perpendicular to the Y axis and parallel to the plane of the drawing. In FIG. 2, the X and Y axes are rotated 90 degrees with respect to FIG. 1.

The X and Y stages are incrementally driven to position a laboratory slide on a slide holder frame 13 with respect to a microscope (not shown). As can be seen from FIGS. 1 and 2, the lower Y stage supports and moves the upper X stage and its associated X stepper motor along the Y axis, while the X stepper motor drives the X stage and the connected slide holder frame 13 along the X axis.

A platform 14 in the Y stage includes linear bearing members 16 and 18 slidably supporting platform 14 on the frame 12. Bearing member 16 includes an elongated rail member 20 rigidly mounted with a series of screws 22 to a portion of the frame 12. Similarly, the opposite rail member 24 of bearing member 16 is mounted through suitable screws 26 to the movable platform 14. An elongated strip of retained rollers 28 mounts within a track in each of the rails 20 and 24 to provide a bearing member 16 of very low friction. Bearing member 16 is a readily available item such as manufactured by Microslides, Inc. of Westbury, N.Y.

The opposite bearing member 18 includes a pair of rails 30, 32 mounted respectively to the frame 12 and the movable platform 14. An elongated bearing bar 34 is slidably mounted within the respective tracks in rails 30 and 32.

Figure 3:
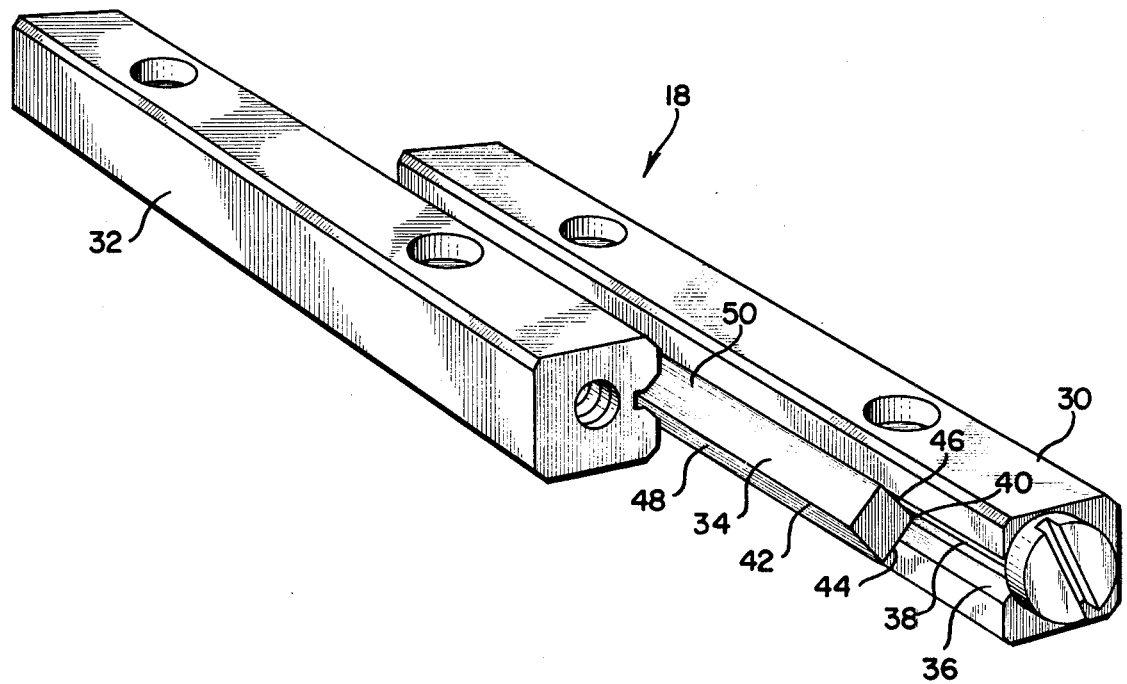
FIG. 3 is a perspective view illustrating an improved bearing member used in both the X and Y stages in accordance with one aspect of the present invention.

Reference may be made to FIG. 3, wherein the details of the bearing member 18 are illustrated. In particular, it can be seen that each of the rails 30 and 32 includes a respective track formed of oppositely inclined planar surfaces 36, 38 extending along the entire length of each of the rails 30 and 32. In a prefferred embodiment of the invention, the elongated bearing bar 34 is formed of oil impregnated bronze material with a square cross-section. This material is commonly available and is referred to as "oilite bronze". Thus, the projections of planar surfaces 36 and 38 intersect at right angles so that the opposite bearing corners 40, 42 are located with the respective tracts defined by the oppositely inclined planar surfaces 36 and 38. This, of course, places two adjacent sides of the bearing bar such as sides 44, 46 in frictional engagement with a substantial length of the respective oppositely inclined bearing track surfaces 36 and 38. It is to be understood, of course, that the adjacent elongated bearing bar sides 48, 50 are also in frictional engagement with a bearing track in rail 32 defined by a similar pair of oppositely inclined perpendicular planar surfaces such as the surfaces 36, 38 indicated on rail 30.

The means for driving platform 14 in the Y stage can best be seen with reference to FIG. 2. A stepping motor 52 is suitably rigidly mounted to frame 12, and includes a rotating threaded shaft 54. A ball nut assembly 56 is threadably mounted on the shaft 54 and is rigidly mounted to a flange portion 57 extending downwardly from movable platform 14. One end 58 of the shaft 54 is rotatably mounted by means of a bearing 60 in a yoke 62 forming a portion of and extending upwardly from the frame 12. The ball nut assembly 56 will be more particularly described hereinafter in connection with FIG. 4. As stepping motor 52 is supplied with stepping pulses, the rotation of shaft 54 is translated into a very precise linear movement of movable platform 14 through the ball nut assembly 56. The Y stage linear bearing members 16 and 18 enable the platform 14 to be rapidly and accurately driven to the desired location with an absolute minimum of settling.

In the upper X stage, a pair of linear bearing members 70 and 72 slidably mount an upper X platform 74 to the lower Y platform 14. Linear bearing member 70 is similar in construction to the bearing member 16 and includes respective rails mounted to platforms 14 and 74 with a strip of retained rollers therebetween. Linear bearing member 72 is similar in construction to the bearing member 18 and includes respective rails mounted to platforms 14 and 74 with a bearing bar therebetween. A stepping motor 76 is rigidly mounted to an extension of platform 14 as can be seen from FIG. 1. Rotating stepping motor shaft 78 is drivingly connected through a ball nut assembly 80 which in turn is rigidly mounted to a flange extension 82 extending from platform 74. The end of shaft 78 is rotatably mounted through suitable bearings in a yoke 84 extending upwardly from platform 14.

Thus, applying a series of stepping pulses to stepping motor 76 rotates shaft 78 thereby translating a very precise linear movement to platform 74 through the ball nut assembly 80.

A slide holder frame 13 is provided for removable mounting of laboratory slides containing a plurality of blood samples. Thus, pulsing the stepping motors 52 and 76 in the apparatus illustrated herein can rapidly and very precisely locate a blood cell with respect to a microscope suitably mounted above the slide. Furthermore, employing the illustrated apparatus with bearing members 16, 18 and 70, 72 enables stage settling to be kept to an absolute minimum. In a constructed white blood cell differential classifier employing the principles herein, the instrument was capable of processing 5 times more samples per unit time than a prior art unit.

FIG. 4 illustrates one of the ball nut assemblies, such as assembly 56. A pair of ball nuts 90, 92 are mounted on the shaft 54 and connected to the flange extension 57 of platform 14. A dampener pad 94 is mounted between ball nut 90 and flange extension 57. Similarly, a dampener pad 96 is mounted between ball nut 92 and ring nut 98 including a threaded adjustable nut 100. Four guide shafts 102 at each corner of the ball nut assembly include a cap screw 104 threadably mounted into one end thereof. A lower shoulder in each cap screw is captured within ring nut 98.

In using the ball nut assembly 56 as shown in FIG. 4 for the driving connection between the stepping motor shaft and the respective platforms in each of the X and Y stages, it has been found that the dampener pads 94 and 96 should preferrably be formed of about 40-100 durometer material. In a constructed embodiment, a 0.125 inch thick silicone rubber of 80 durometer was used. The dampener pads 94 and 96 exert a positive pressure on the ball nuts 90 and 92 to load the ball nuts against the shafts. In addition, since the motor shafts are driving relatively heavy loads which must be accelerated from 0 to 2000 pulses per second at the start of each move, the shaft end loads are rather severe. The dampener pads provide sufficient compliance to reduce this end load shock on the motors. The 80 durometer rubber pads 94 and 96 in the constructed embodiment were also found to overcome the slight amount of needed bearing friction introduced by the elongated bar bearing assemblies 18 and 72 thereby minimizing any accuracy error induced into the system by virtue of the slight increase in bearing friction. Therefore, the range of 40-100 durometer includes a sufficiently high durometer rubber for overcoming the slight bearing friction and yet supplies sufficient compliance to reduce the motor end loads.

It is to be understood, of course, that in the constructed version wherein the bearing bar was formed of oil impregnated bronze, an 80 durometer rubber pad was found sufficient to supply the necessary positive pressure and compliance. With other bearing bar materials, it may be necessary to utilize pads of different durometers or formed of dirrerent materials. Tests were conducted with Teflon, Rulon and bronze impregnated Teflon, all with varying results. While the aforementioned bearing bar materials could be used in systems where precision, accuracy and low settling time was not required, in instances where extremely rigid specifications are needed, it was found that the oil impregnated bronze bearing bar in the bearing assemblies 18 and 72 provided the desired results.

While particular embodiments of the present invention have been shown and described, it will be obvious to those skilled in the art that various changes and modifications may be made without departing from the invention in its broader aspects. Accordingly, the aim of the appended claims is to cover all such changes and modifications as may fall within the true spirit and scope of the invention.

What is claimed is:

1. A rectilinear drive apparatus for rapidly and accurately moving a driven component along a rectilinear direction to a desired location with a minimum of vibration settling time upon reaching the desired location comprising:
   a frame;
   a pulsed stepping motor mounted to said frame, including a rotating shaft rotated incrementally in response to said pulsed stepping motor;
   drive coupling means interconnecting said rotating shaft to said driven component and rectilinearly moving said driven component in incremental steps in response to said incremental rotation of said shaft; and
   bearing members slidably mounting said driven component to said frame, at least one of said bearing members including,
      a pair of rail members, each having a respective elongated bearing track,
      means for rigidly mounting one of said rail members to said driven component and the other to said frame to align said elongated bearing tracks in facing relationship along said rectilinear direction; and
      an elongated metal bar slidably mounted within said bearing tracks to slidably support said driven component during movement thereof to said desired location.

2. Rectilinear drive apparatus according to claim 1, wherein each of said bearing tracks is defined by oppositely inclined surfaces extending along one side of said rail members, and said elongated metal bar extends along said tracks in engagement with a substantial length of said oppositely inclined surfaces.

3. Rectilinear drive apparatus according to claim 2, wherein each of said oppositely inclined surfaces is planar, and said elongated metal bar includes a rectangular cross section.

4. Rectilinear drive apparatus according to claim 3, wherein said oppositely inclined planar surfaces are perpendicular.

5. Rectilinear drive apparatus according to claim 4, wherein said drive coupling means includes ball nut means mounted to said driven component and engaging said stepping motor shaft.

6. Rectilinear drive apparatus according to claim 5, wherein said ball nut means includes a pair of ball nuts and a pair of dampener pads of resilient material, said pads having sufficient resiliency to urge said bull nuts into positive driving engagement with said stepping motor shaft and to reduce shocks otherwise transmitted to said shaft during initial acceleration thereof.

7. An X-Y rectilinear drive apparatus for rapidly and accurately moving a component along respective X-Y rectilinear axes to a desired location with settling of vibration to be achieved immediately upon reaching said location comprising:
   a frame having respective top X and lower Y rectilinear drive stages mounted thereto;
   (1) said Y rectilinear drive stage including,
   (a) a Y pulsed stepping motor mounted to said frame, including a rotating shaft rotated incrementally in response to said Y pulsed stepping motor;
   (b) a Y stage platform;
   (c) drive coupling means interconnecting said Y pulsed stepping motor shaft to said Y stage platform and rectilinearly moving said platform in incremental steps in response to said incremental rotation of said shaft;
   (d) bearing members slidably mounting said Y stage platform to said frame, at least one of said bearing members including,
      a pair of rail members, each having a respective elongated bearing track,
      means for rigidly mounting one of said rail members to said Y stage platform and the other to said frame to align said elongated bearing tracks in facing relationship along said Y rectilinear direction, and
      an elongated metal bar slidably mounted within said bearing tracks to slidably support said Y stage platform during movement thereof; and (2) said X rectilinear drive stage including;
(a) an X pulsed stepping motor mounted to said Y stage platform, including a rotating shaft rotated incrementally in response to said X pulsed stepping motor;
(b) an X stage platform;
(c) drive coupling means interconnecting said X pulsed stepping motor shaft to said X stage platform and rectilinearly moving said platform in incremental steps in response to said incremental rotation of said shaft;
(d) bearing members slidably mounting said X stage platform to and above said Y stage platform, at least one of said bearing members including,
a pair of rail members, each having a respective elongated bearing track,
means for rigidly mounting one of said rail members to said X stage platform and the other to said Y stage platform to align said elongated bearing tracks in facing relationship along said X rectilinear direction, and
an elongated metal bar slidably mounted within said bearing tracks to slidably support said X stage platform during movement thereof.

8. X-Y rectilinear drive apparatus according to claim 7, wherein each of said bearing tracks is defined by oppositely inclined surfaces extending along one side of said rail members, and said elongated metal bar extends along said tracks in engagement with a substantial length of said oppositely inclined surfaces.

9. X-Y rectilinear drive apparatus according to claim 8, wherein each of said oppositely inclined surfaces is planar, and said elongated metal bar includes a rectangular cross section.

10. X-Y rectilinear drive apparatus according to claim 9, wherein said oppositely inclined planar surfaces are perpendicular.

11. X-Y rectilinear drive apparatus according to claim 7, wherein each of said drive coupling means includes ball nut means mounted to said driven component and engaging said stepping motor shaft.

12. X-Y rectilinear drive apparatus according to claim 11, wherein each of said ball nut means includes a pair of ball nuts and a pair of dampener pads of resilient material, said pads having sufficient resiliency to urge said ball nuts into positive driving engagement with said stepping motor shaft and to reduce shocks otherwise transmitted to said shaft during initial acceleration thereof.

13. X-Y rectilinear drive apparatus according to claim 12, wherein each of said elongated metal bars is formed of oil impregnated bronze.

14. X-Y rectilinear drive apparatus according to claim 13, wherein each of said dampener pads is formed of 40–100 durometer rubber.

15. X-Y rectilinear drive apparatus according to claim 13, wherein each of said dampener pads is formed of 80 durometer rubber.

16. In combination, a bearing assembly comprising a pair of rails each having an elongated groove, an elongated bearing member adapted to fit the groove in each rail, said bearing member in slidable engagement with said rails.

* * * * *